United States Patent [19]

Imazu

[11] Patent Number: 4,714,064
[45] Date of Patent: Dec. 22, 1987

[54] CONTROL DEVICE FOR INTERNAL COMBUSTION ENGINE

[75] Inventor: Shigeki Imazu, Hiroshima, Japan

[73] Assignee: Mazda Motor Corporation, Hiroshima, Japan

[21] Appl. No.: 854,864

[22] Filed: Apr. 23, 1986

[30] Foreign Application Priority Data

Apr. 25, 1985 [JP] Japan ................... 60-90162

[51] Int. Cl.$^4$ .................. F02M 3/07; F02P 5/04
[52] U.S. Cl. ..................... 123/339; 123/325; 123/418
[58] Field of Search .............. 123/418, 339, 325

[56] References Cited

U.S. PATENT DOCUMENTS

| 4,203,395 | 5/1980 | Cromas et al. | 123/339 |
|---|---|---|---|
| 4,241,710 | 12/1980 | Peterson, Jr. | 123/339 |
| 4,242,994 | 1/1981 | Keely | 123/339 |
| 4,319,327 | 3/1982 | Higashiyama et al. | 123/339 |
| 4,328,775 | 5/1982 | Ironside | 123/339 |
| 4,332,226 | 6/1982 | Nomura et al. | 123/339 |
| 4,344,397 | 8/1982 | Geiger | 123/339 |
| 4,389,997 | 6/1983 | Nakano et al. | 123/339 |
| 4,399,791 | 8/1983 | Kobayashi et al. | 123/339 |
| 4,402,289 | 9/1983 | Ikeura | 123/339 |
| 4,404,805 | 9/1983 | Curtil | 123/339 |
| 4,406,262 | 9/1983 | Ikeura | 123/339 |
| 4,408,588 | 10/1983 | Mausner | 123/339 |
| 4,413,602 | 11/1983 | Inoue et al. | 123/339 |
| 4,498,429 | 2/1985 | Satow et al. | 123/339 |
| 4,499,882 | 2/1985 | Saito et al. | 123/339 |
| 4,508,075 | 4/1985 | Takao | 123/339 |
| 4,526,153 | 7/1985 | Hasegawa et al. | 123/339 |
| 4,541,386 | 9/1985 | Kishi et al. | 123/339 |
| 4,542,729 | 9/1985 | Yamato et al. | 123/339 |
| 4,543,634 | 9/1985 | Kobayashi | 123/418 |
| 4,545,349 | 10/1985 | Ito | 123/339 |
| 4,552,109 | 11/1985 | Boccadoro | 123/339 |
| 4,552,116 | 11/1985 | Kuroiwa et al. | 123/339 |
| 4,561,403 | 12/1985 | Oyama et al. | 123/339 |
| 4,582,032 | 4/1986 | Hara | 123/339 |
| 4,582,037 | 4/1986 | Otsuka et al. | 123/339 |

Primary Examiner—Ronald B. Cox
Attorney, Agent, or Firm—Burns, Doane, Swecker & Mathis

[57] ABSTRACT

The disclosure is directed to a control device for an internal combustion engine for a motor vehicle such as an automobile or the like, having a control valve disposed in a by-pass passage for opening and shutting the by-pass passage which communicates the upstream side and the downstream side of an intake passage by bypassing a throttle valve, in which the engine speed in idling operating condition is controlled to a target speed. This control device is characterized in that the ignition timing is rather advanced than ordinary idling ignition timing during a certain period from the instance when the engine has entered into the idling operating condition after having received a signal detecting the idling operating condition of the engine.

7 Claims, 7 Drawing Figures

CONTROL DEVICE FOR INTERNAL COMBUSTION ENGINE

BACKGROUND OF THE INVENTION

The present invention generally relates to an internal combustion engine for use in a motor vehicle and the like, having a self-idling governor which is capable of automatically controlling the engine speed at an idling operating condition of the engine to a target speed and more particularly, to an ignition timing control of the engine at the idling operating condition thereof.

A known internal combustion engine having a self-idling governor is disclosed in the Japanese Laid-open Patent Publication No. 54-76723 wherein a control valve is provided in a by-pass passage which communicates the upstream side and the downstream side of an intake passage by by-passing a throttle valve, with the control valve having the purpose of opening and shutting the by-pass passage and when the engine is in idling operating condition, an idling speed of the engine is controlled to become the target speed through the control of the amount of by-pass air by controlling the opening and shutting of the control valve.

Meanwhile, with respect to the ignition control of the engine, when the engine is in idling operating condition, the ignition timing thereof is usually fixed to an idling ignition timing in advance. This idling ignition timing is set to the spark delaying side in consideration of instability in combustion condition of the engine during idling operating condition thereof.

Upon continuation of engine loading condition during a certain period, immediately after the engine has been shafted to the idling operating condition from the speed decreasing condition, the engine is in relatively favorable combustion condition, since fuel injected into the combustion chamber is in favorable vaporized or atomized condition owing to the fact that the wall surface of the combustion chamber is high in temperature or the like.

Accordingly, immediately after the engine has been shifted to such an idling operating condition as described above, if the ignition timing is fixed to the idling ignition timing, it is delayed more than necessary with respect to the combustion condition of the engine and this results in that the engine is lowered in its speed. Therefore, in the above described engine having a self-idling governor, the self-idling governor is operated so as to raise the idling speed of the engine and the fuel is consumed more than necessary, with the increase of the amount of intake air.

SUMMARY OF THE INVENTION

Accordingly, an essential object of the present invention is to provide an improved ignition timing control device of the internal combustion engine having a self-idling governor which is capable of improving the fuel consumption rate at the time of shift of the engine condition to the idling operating condition by utilizing the self-idling governor, with the engine being noticed to be in favorable combustion condition, immediately after the engine has been shifted to the idling operating condition through a condition decreased in its speed after a continuation of running condition thereof.

Another important object of the present invention is to provide an ignition timing control device of the above described type which is simple in construction and stable in functioning, and can be readily incorporated into various internal combustion engines at low cost.

In order to accomplish these and other objects, according to one preferred embodiment of the present invention, there is provided a control device for an internal combustion engine having an ignition timing setting means for setting an ignition timing of the engine, an idling detecting means for detecting an idling operating condition of the engine, an idling speed control means for controlling the idling engine speed to a target speed by controlling the amount of intake air after having received a signal from the idling detecting means, and an ignition timing correcting means for advancing the ignition timing set by the ignition timing setting means than ordinary idling ignition timing during a certain period from the instance when the engine has entered into the idling operating condition after having received the signal from the idling detecting means.

By the construction according to the present invention as described above, the engine can be improved in fuel consumption rate thereof without interrupting the stability in idling operating condition thereof by advancing the ignition timing during a period wherein the engine is in favorable combustion condition immediately after the running condition thereof even in idling operating condition.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
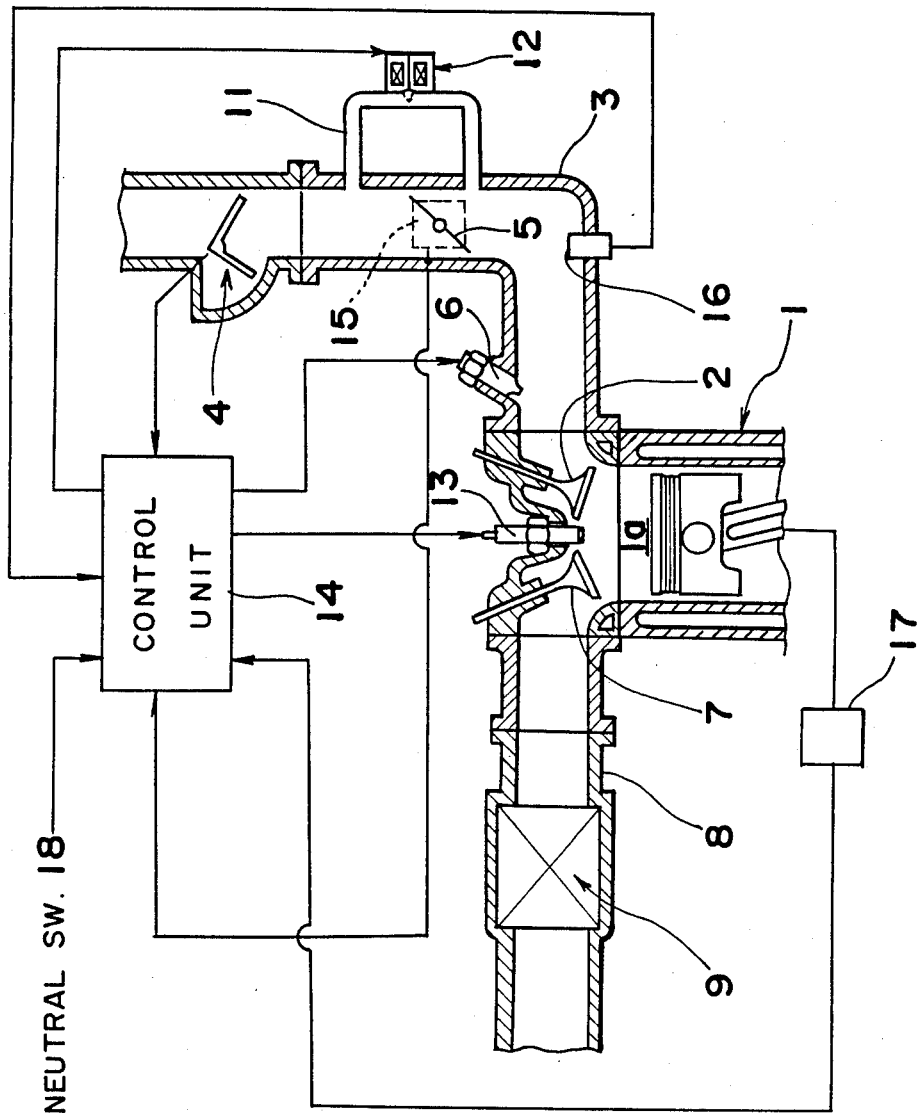
FIG. 1 is a fragmentary schematic diagram of a system construction of an internal combustion engine according to one preferred embodiment of the present invention.

Before the description of the present invention proceeds, it is to be noted that like parts are designated by like reference numerals throughout the accompanying drawings.

Referring now to the drawings, FIG. 1 shows a schematic diagram of a system construction according to one preferred embodiment of the present invention.

In FIG. 1, an internal combustion engine 1 for use, for example, in a motor vehicle is provided with an intake passage 3 having an air flow sensor 4, a throttle valve 5 and a fuel injector 6 each disposed therein in turn from upstream side to downstream side, and an exhaust passage 8 having an exhaust gas purifying unit, for example, a catalytic converter 9 disposed therein, with the intake passage 3 and the exhaust passage 8 being opened and shut by an intake valve 2 and an exhaust valve 7, respectively. The intake passage 3 of the engine 1 is provided with a by-pass passage 11 which communicates the upstream side and the downstream side of the intake passage 3 by by-passing the throttle valve 5 and a control valve 12 operated by a duty solenoid is arranged in the course of the by-pass passage 11 so as to control the quantity of by-pass air passing through the by-pass passage 11 so that the engine speed becomes a target speed, when the engine is in idling operating condition. The control valve 12 is operatively controlled by control signals from a control unit 14, as well as the fuel injector 6 and a spark plug 13 disposed in a combustion chamber 1a of the engine 1.

The above described control unit 14 executes necessary controls by being applied with such input data as the quantity of intake air detected by the air flow sensor 4, a throttle opening detected by a throttle sensor 15, a suction pressure detected by a boost sensor 16 which is disposed in the intake passage 3 at the downstream side of the throttle valve 5, the engine speed detected by a revolution sensor 17, on-off signals of a neutral switch 18 of a transmission (not shown) and the like. The control with respect to the fuel injector 6 which is one of the controls executed by the control unit 14 is substantially a control wherein fuel is injected into the combustion chamber 1a during a given valve opening period, by determining each injection period in compliance with the quantity of intake air of every moment detected by the air flow sensor 4.

Furthermore, with respect to the control valve 12 disposed in the by-pass passage 11, as has been stated, the engine speed is controlled by the control unit 14 so as to coincide with the target speed set in advance, while the engine is in idling operating condition, by controlling a duty ratio of the control valve 12 in order to increase or decrease the quantity of by-pass air.

The above described two kinds of control are of known ones, and therefore, the details thereof will not be further described for the sake of brevity because they are not a part of the subject matter of the present invention.

In the next place, the control with respect to the spark plug 13 executed by the control unit 14 will be explained hereinafter.

Figure 2:
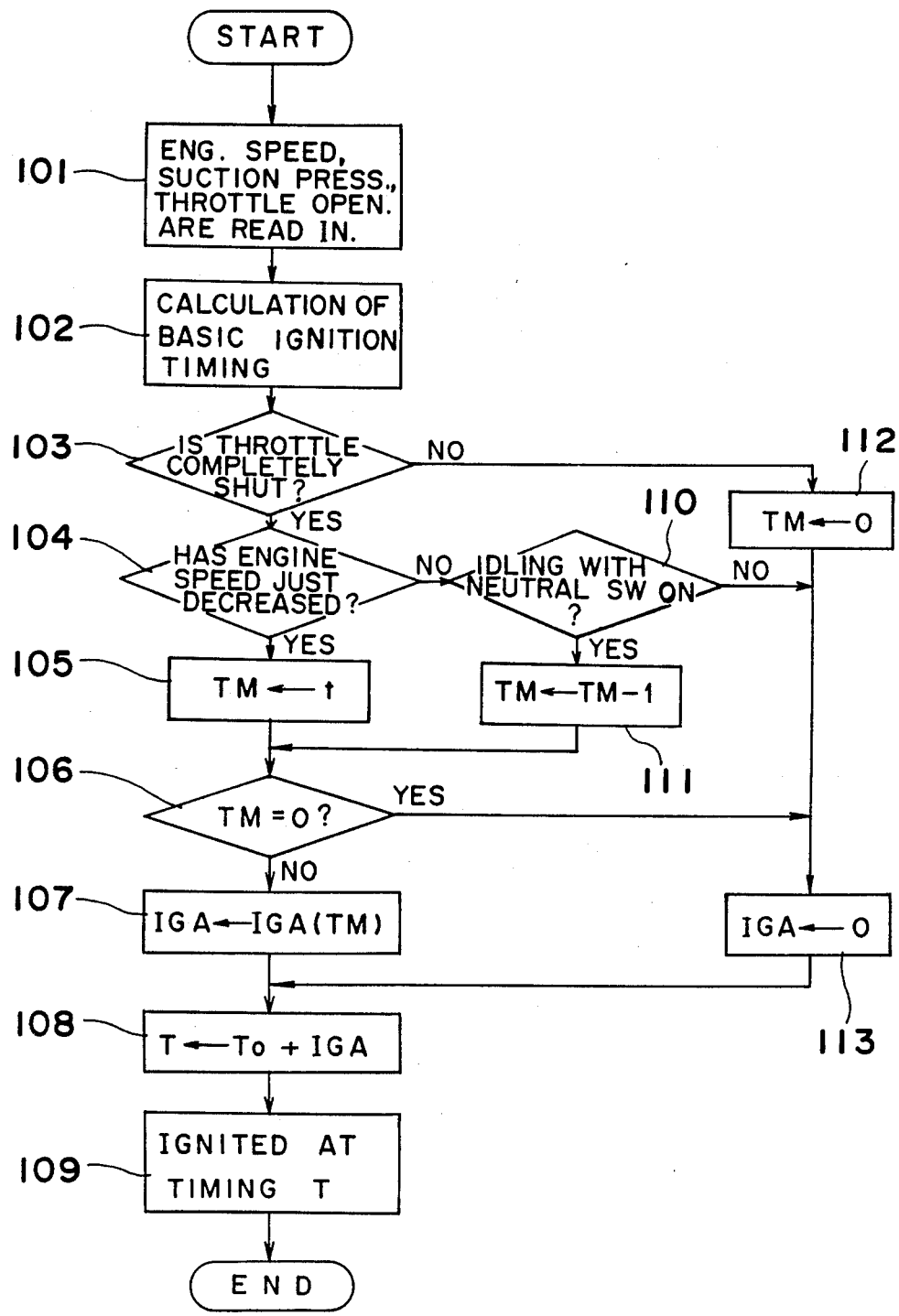
FIG. 2 is a flow chart for explaining an ignition timing control executed by a control unit of FIG. 1.

In FIG. 2, there is shown a flow chart for explaining the control of ignition timing executed by the control unit 14.

Figure 3:
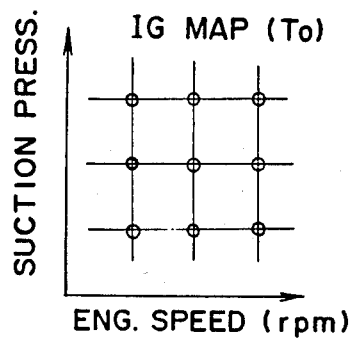
FIG. 3 is a graph showing a map IGMAP of a basic ignition timing.

At the beginning of this control, the engine speed, the suction pressure and the throttle opening are read into the control unit 14 at step 101. At the subsequent step 102, a basic ignition timing To is calculated by the use of, for example, a map IGMAP as shown in FIG. 3 for the determination of the basic ignition timing. As shown in the map IGMAP, the basic ignition timing To is suitably set in advance for each operating area divided by the engine speed and the suction pressure. At step 103, it is judged whether or not the throttle valve 5 is completely shut from the throttle opening read in. In case where the throttle valve 5 is completely shut, it is judged at step 104, whether or not the engine has just decreased in its speed and this judgement can be done by comparing the throttle opening of previous state with that of present state. When it is judged that the engine has just decreased in its speed at this step 104, a time t is set in a timer TM at the subsequent step 105 as a period during which the engine is favorably maintained in its combustion condition from the beginning of the idling operating condition.

Figure 4A:
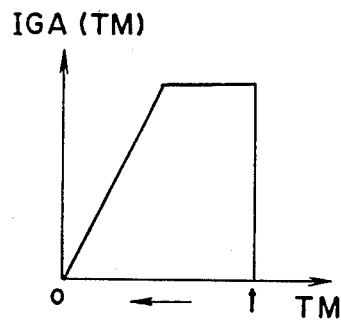
FIG. 4a is a graph showing a function which gives a spark advancing term at idling operating condition of the engine.

Furthermore, when it is confirmed that TM is not equal to zero at step 106, an ignition timing advancing term or spark advancing term IGA is calculated at step 107 and is given as a function IGA(TM) of the present time TM of the timer TM, for example, as shown in FIG. 4a. The function IGA(TM) giving the ignition timing advancing term has a constant value, for example, 5° CA (Cranking Angle) until a certain time elapses from the beginning t of the idling operating condition and thereafter, it decreases, for example, at the rate of 0.35° CA per second in proportion to the decrease of the time TM in the timer. The function IGA(TM) decreases at the latter half of the time elapsed in the timer for desirably preventing a shock at the change of ignition timing advancing amount and for being caused to correspond to the combustion condition of the engine.

At the subsequent step 108, the above mentioned ignition timing advancing term IGA is added to the basic ignition timing To so as to obtain a desired final ignition timing T. At step 109, the spark plug 13 is ignited at the aforementioned ignition timing T so that one cycle of the ignition control is completed.

In addition, when the throttle valve 5 is completely shut (step 103) but in case where the engine has not just decreased in its speed, that is, in case where the engine is in the midst of decrease of its speed or in case where the engine is in idling operating condition, the procedure proceeds to step 110 from step 104, and at step 110, it is judged whether or not the neutral switch 18 is on and the engine is in idling zone, i.e., the engine speed is lower than the preetermined value. In case where the judgement at step 110 is YES, 1 is subtracted from the time value of the timer TM at step 111 and hereupon, when this value is not equal to zero, the spark plug 13 is ignited at the ignition timing T wherein the ignition timing advancing term IGA(TM) corresponding to the time in the timer TM is added to the basic ignition timing To in the order of steps 107, 108 and 109.

In other words, when the engine is shifted from speed decreasing condition to idling operating condition, the ignition timing advancing term IGA is added to the basic ignition timing To so that the ignition timing is set to the ignition timing advancing side during a certain period and upon the lapse of this period, the basic ignition timing To, that is, an idling ignition timing is finally set.

Moreover, when the engine is in an operating condition except those described above, that is, when the throttle valve 5 is not completely shut, the timer TM is reset to zero at step 112 and this results in that the ignition timing advancing term IGA is set to zero at the subsequent step 113.

In addition, in case where the throttle valve 5 is completely shut, but the neutral switch is off, or in case where the engine is not in idling zone, or in case where the time in the timer TM is up, i.e., TM equal zero, the ignition timing advancing term IGA is made to be zero at step 113 as well as the aforementioned case.

Figure 4B:
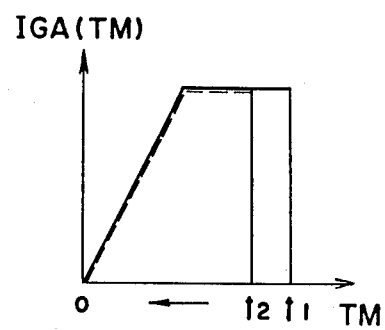
FIGS. 4b through 4d are graphs similar to FIG. 4a which particularly show modifications thereof.

It is to be noted here that as shown in FIG. 4b, the time t in the timer may be such a variable value as t1 or t2 in accordance with the favorable extent of combustion conditions of the engine which is given by a coolant temperature, a period during which the engine is shifted to the idling operating condition from the beginning of speed decreasing condition.

Figure 4C:
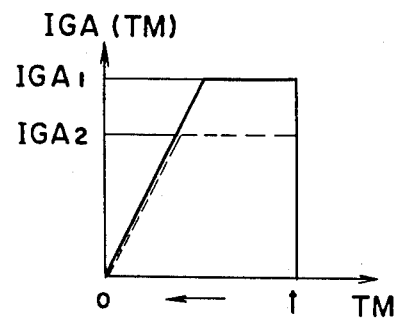

It is further to be noted that as shown in FIG. 4c, the ignition timing advancing value may be changed in accordance with the favorable extent of the combustion condition of the engine.

Figure 4D:
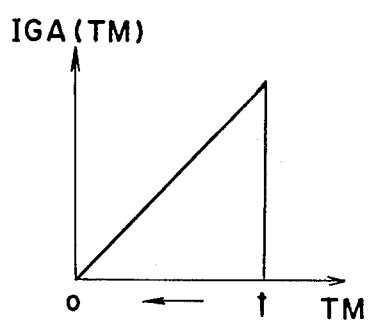

Moreover, it should be noted that as shown in FIG. 4d, the ignition timing advancing value may be decreased in proportion to the time elapsed.

As described so far, immediately after the idling operating condition of the engine wherein the engine is maintained in favorable combustion condition, the ignition timing is set rather to the ignition timing advancing side than the ordinary idling ignition timing and this results in that the engine tends to be raised in its speed. Accordingly, the control valve 12 arranged in the by-pass passage 11 is controlled by the control unit 14 so as to lower the engine speed and as a result, since the amount of intake air is decreased as a whole, the engine is improved in fuel consumption rate thereof.

It is to be noted here that in the above described embodiment, although the timer TM is set when the engine has just decreased in its speed, the timer TM may be set at the beginning of idling operating condition of the engine.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A control device for an internal combustion engine which comprises:
    an ignition timing setting means for setting an ignition timing of said engine;
    an idling detecting means for detecting an idling operating condition of said engine;
    an idling speed control means for controlling the idling engine speed to a target speed by controlling the amount of intake air after having received a signal from said idling detecting means;
    a deceleration detecting means for detecting whether said engine has decreased into an idle operating speed range; and
    an ignition timing correcting means for advancing said ignition timing set by said ignition timing setting means relative to ordinary idling ignition timing when said engine has entered into said idling operating condition after detection of deceased speed of said engine by said deceleration detecting means by receiving said signal from said idling detecting means and a signal from said deceleration detecting means, said ignition timing correcting means maintaining the advanced ignition timing during a predetermined time of the idling operating condition of said engine.

2. A control device for an internal combustion engine as claimed in claim 1, wherein said ignition timing setting means includes a basic ignition timing setting means corrresponding to the operating condition of said engine and an advancing angle setting means for setting an advancing angle after the idling operating condition of said engine, the ignition timing being determined by adding a value set by said advancing angle setting means to a value set by said basic ignition timing setting means.

3. A control device for an internal combustion engine as claimed in claim 1, wherein said idling speed control means includes a control valve disposed in a by-pass passage for opening and shutting said by-pass passage which communicates the upstream side and the downstream side of an intake passage by by-passing a throttle valve.

4. A control device for an internal combustion engine as claimed in claim 1, wherein said ignition timing correcting means includes a timer means for counting the lapse of said certain period and a function setting means for setting the amount of advancing angles with respect to said lapse of certain period as a function.

5. A control device for an internal combustion engine as claimed in claim 1, wherein the amount of advancing angles is decreased after a certain time has elapsed from the beginning of said period.

6. A control device for an internal combustion engine as claimed in claim 1, wherein the amount of advancing angle is decreased in proportion to the time elapsed during said period.

7. A control device for an internal combustion engine as claimed in claim 1, further comprising a neutral detecting means for determining whether a transmission of said engine is in a neutral condition, and second detecting means for determining whether said engine is in a predetermined low load or low speed zone and wherein said idling operating condition is determined based on the signals of said neutral detecting means and the second detecting means.

* * * * *